US008707298B2

(12) United States Patent
Araki

(10) Patent No.: US 8,707,298 B2
(45) Date of Patent: Apr. 22, 2014

(54) INFORMATION PROCESSING APPARATUS, INSTALLER PROGRAM, AND RECORDING MEDIUM

(75) Inventor: Shigeo Araki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 674 days.

(21) Appl. No.: 12/801,064

(22) Filed: May 20, 2010

(65) Prior Publication Data
US 2010/0318984 A1 Dec. 16, 2010

(30) Foreign Application Priority Data

Jun. 12, 2009 (JP) ................................. 2009-141264

(51) Int. Cl.
G06F 9/445 (2006.01)
G06F 15/16 (2006.01)
G06F 3/12 (2006.01)

(52) U.S. Cl.
USPC ........... 717/178; 717/173; 709/219; 358/1.15

(58) Field of Classification Search
None
See application file for complete search history.

(56) References Cited

U.S. PATENT DOCUMENTS

| | | | | |
|---|---|---|---|---|
| 6,557,054 B2 * | 4/2003 | Reisman | ........................ | 709/219 |
| 6,658,464 B2 * | 12/2003 | Reisman | ........................ | 709/219 |
| 7,069,553 B2 * | 6/2006 | Narayanaswamy et al. | .. | 717/178 |
| 7,111,250 B1 * | 9/2006 | Hayward et al. | ............... | 715/826 |
| 7,321,437 B2 * | 1/2008 | Parry | ........................... | 358/1.15 |
| 7,349,951 B2 * | 3/2008 | Clough et al. | ................. | 709/219 |
| 7,653,687 B2 * | 1/2010 | Reisman | ........................ | 717/178 |
| 7,777,905 B2 * | 8/2010 | Liu | ................................ | 358/1.15 |
| 7,903,272 B2 * | 3/2011 | Kato | ............................. | 358/1.15 |
| 8,024,399 B2 * | 9/2011 | Reisman | ........................ | 709/219 |
| 8,131,883 B1 * | 3/2012 | Reisman | ........................ | 709/219 |
| 8,321,499 B2 * | 11/2012 | Reisman | ........................ | 709/219 |
| 8,407,682 B2 * | 3/2013 | Reisman | ........................ | 717/173 |
| 8,499,030 B1 * | 7/2013 | Reisman | ........................ | 709/219 |
| 8,505,004 B2 * | 8/2013 | Burke, Jr. | ....................... | 717/178 |

(Continued)

FOREIGN PATENT DOCUMENTS

JP 2001-075758 3/2001
JP 2005-173701 6/2005

OTHER PUBLICATIONS

Charbel El Kaed et al.; Dynamic Service Adaptation for Plug and Play Device Interoperability; Oct. 2011; retrieved online on Nov. 25, 2011; pp. 46-54; Retrieved from the Internet: <URL: http://delivery.acm.org/10.1145/2150000/2147679/p46-el_kaed.pdf?ip=151.207.250.71>.*

(Continued)

*Primary Examiner* — Thuy Dao
*Assistant Examiner* — Hanh T Bui
(74) *Attorney, Agent, or Firm* — Harness, Dickey & Pierce, P.L.C.

(57) ABSTRACT

An image forming apparatus includes a printer driver; a first software-identifier storage unit that stores therein a first software identifier that identifies software of a printing device, in which a second plugin for enabling the printing device to implement a feature corresponding to a feature of a first plugin to be installed in the printer driver, can be installed; an installable plugin determining unit that compares the first software identifier with the second software identifier and determines whether the second plugin can be installed in the software of the printing device; and an installing unit that installs, if it is determined that the second plugin can be installed, the first plugin in the printer driver.

14 Claims, 7 Drawing Sheets

(56) References Cited

U.S. PATENT DOCUMENTS

| | | | | |
|---|---|---|---|---|
| 8,544,016 | B2* | 9/2013 | Friedman et al. | 717/178 |
| 2003/0200427 | A1* | 10/2003 | Kemp et al. | 713/1 |
| 2003/0231328 | A1* | 12/2003 | Chapin et al. | 358/1.15 |
| 2004/0177352 | A1* | 9/2004 | Narayanaswamy et al. | 717/175 |
| 2004/0227971 | A1* | 11/2004 | Clough et al. | 358/1.15 |
| 2006/0103869 | A1* | 5/2006 | Kato | 358/1.13 |
| 2006/0209337 | A1* | 9/2006 | Atobe et al. | 358/1.15 |
| 2007/0073845 | A1* | 3/2007 | Reisman | 709/219 |
| 2007/0073846 | A1* | 3/2007 | Reisman | 709/219 |
| 2009/0144398 | A1* | 6/2009 | Reisman | 709/219 |
| 2009/0190150 | A1* | 7/2009 | Selvaraj et al. | 358/1.13 |
| 2010/0058321 | A1* | 3/2010 | Anderson et al. | 717/173 |
| 2010/0110476 | A1* | 5/2010 | Gorgenyi et al. | 358/1.15 |
| 2010/0309519 | A1* | 12/2010 | Nishihara | 358/1.15 |
| 2010/0318984 | A1* | 12/2010 | Araki | 717/174 |
| 2012/0297375 | A1* | 11/2012 | Burke, Jr. | 717/173 |

OTHER PUBLICATIONS

Printer Drivers for UNIX & Linux Systems; 2008; Lexmark; retrieved online on Nov. 25, 2013; pp. 1-49; Retrieved from the Internet: <URL: http://www.lexmark.com/publications/pdfs/print_drivers/en/ug.pdf>.*

Chaohua Gan et al.; Variable Data Printer System Design and Implementation; 2008; IEEE; retrieved online on Nov. 25, 2013; pp. 322-325. Retrieved from the Internet: <URL: http://ieeexplore.ieee.org/stamp/stamp.jsp?tp=&arnumber=4723262>.*

* cited by examiner

```
[pluginA]
PlatformName=platformA
PlatformName=platformC
```

```
[PrinterA]
PlatformName=platformA
```

INFORMATION PROCESSING APPARATUS, INSTALLER PROGRAM, AND RECORDING MEDIUM

CROSS-REFERENCE TO RELATED APPLICATIONS

The present application claims priority to and incorporates by reference the entire contents of Japanese Patent Application No. 2009-141264 filed in Japan on Jun. 12, 2009.

BACKGROUND OF THE INVENTION

1. Field of the Invention

The present invention relates to an information processing apparatus, an installer program, and a recording medium.

2. Description of the Related Art

A technology is known that can be used for extending the features of a printing device or similar by installing a plugin. A technology is also known that can be used to install a corresponding plugin for extending, so as to implement the new features that have been added to the printing device, the features of the printer driver of the information processing apparatus, such as a personal computer (PC), that sends print requests to the printing device.

The information processing apparatus, typically, conducts various consistency checks and then installs the plugin in the printer driver. For example, Japanese Patent Application Laid-open No. 2005-173701 discloses a technology that can be used to install a plugin after checking, by referring to a management table that contains PDL driver versions and installable plugins in an associated manner, consistency between the plugin and the PDL driver.

In the above-described conventional technology, only the consistency between a first plugin, which is a plugin intended to be installed on the printer driver, and the printer driver is checked. Therefore, there is a possibility that even when a second plugin, which is a plugin for the printing device that enables the printing device to implement a feature corresponding to a feature realized by the first plugin, cannot be installed in the printing device, the first plugin is still installed in the printer driver. In other words, a feature that cannot be used still after the feature extension of the printing device may be added to the printer driver.

SUMMARY OF THE INVENTION

It is an object of the present invention to at least partially solve the problems in the conventional technology.

According to an aspect of the present invention there is provided an image forming apparatus. The image forming apparatus includes: a printer driver; a first software-identifier storage unit that stores therein a first software identifier that identifies software of a printing device, in which a second plugin for enabling the printing device to implement a feature corresponding to a feature of a first plugin to be installed in the printer driver, can be installed; a software-identifier acquiring unit that acquires a second software identifier that identifies software of a printing device that is under the control of the printer driver; an installable plugin determining unit that acquires the first software identifier from the first software-identifier storage unit, compares the first software identifier with the second software identifier, which is acquired by the software-identifier acquiring unit, and determines whether the second plugin can be installed in the software of the printing device under the control of the printer driver; and an installing unit that installs, if it is determined that the second plugin can be installed, the first plugin in the printer driver.

According to another aspect of the present invention there is provided a computer program product comprising a computer-usable medium having computer-readable program codes. The program codes when executed causing a computer to execute: acquiring, by a software-identifier acquiring unit, a second software identifier that identifies software of a printing device that is under the control of a printer driver; determining, by an installable plugin determining unit, that includes acquiring, from a first software-identifier storage unit, a first software identifier that identifies software of a printing device in which a second plugin for enabling the printing device to implement a feature corresponding to a feature of a first plugin to be installed in the printer driver can be installed, comparing the first software identifier with the second software identifier that is acquired at the acquiring, and determining whether the second plugin can be installed in the software of the printing device that is under the control of the printer driver; and installing, by an installing unit, the first plugin in the printer driver if it is determined that the second plugin can be installed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an information processing apparatus, an installer program, and a recording medium according to the present invention are described in detail below with reference to the accompanying drawings.

Although, in the following embodiments, a PC is used as the information processing apparatus, some other devices can be used.

First Embodiment

The configuration of a printer system that includes a PC according to the first embodiment is described below.

Figure 1:
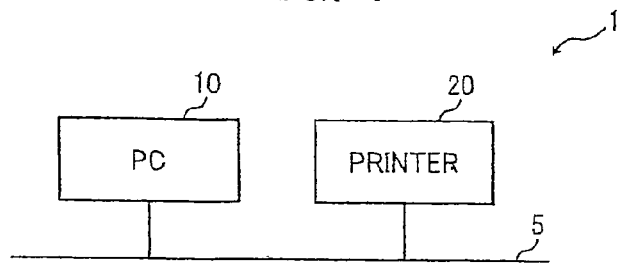
FIG. 1 is a block diagram of the exemplary configuration of a printer system according to the first embodiment.

FIG. 1 is a block diagram of the exemplary configuration of a printer system 1 according to the first embodiment. The printer system 1 includes a PC 10 that sends a print request, a printer 20 (an example of a printing device) that receives the print request from the PC 10 and executes printing in accordance with the print request. The PC 10 and the printer 20 are connected to each other via a network 5.

The printer system 1 can include a plurality of PCs 10 and a plurality of printers 20. The network 5 can be any network, in particular, can be either a wired network or a wireless network, and can be either a local area network (LAN) or the public line. The PC 10 and the printer 20 can be connected to each other via a universal serial bus (USB) cable or the like.

Figure 2:
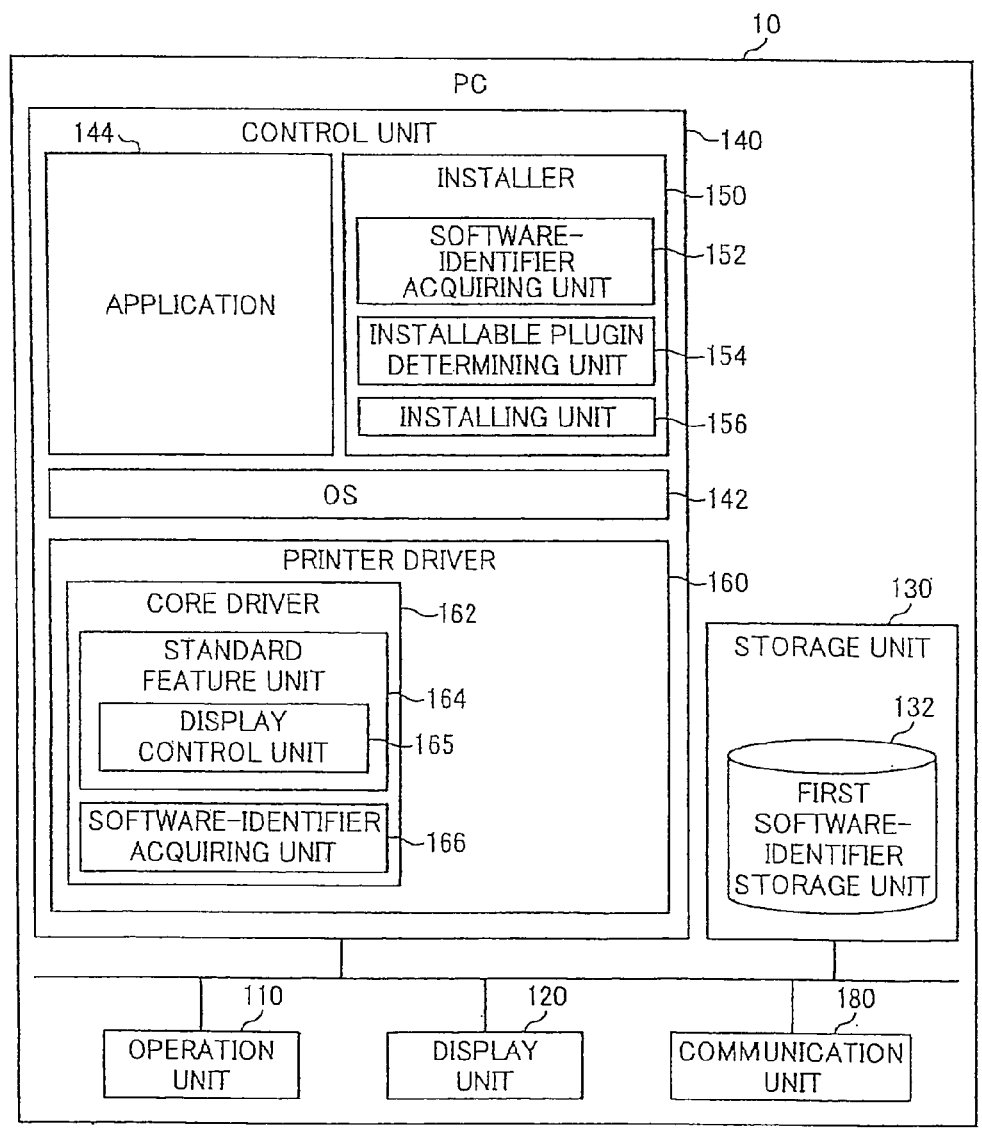
FIG. 2 is a block diagram of the exemplary configuration of a PC according to the first embodiment.

FIG. 2 is a block diagram of the exemplary configuration of the PC 10 according to the first embodiment. As shown in FIG. 2, the PC 10 includes an operation unit 110, a display unit 120, a storage unit 130, a control unit 140, and a communication unit 180.

The operation unit 110 is a device with which the user enters various instructions. The operation unit 110 is realized by an existing input device, such as a keyboard, a mouse, a touch-pad, or a touch panel.

The display unit 120 is a device that displays thereon various screens such as application-based operation screens or menu screens that includes a screen for print settings. The display unit 120 is realized by an existing display device, such as a liquid-crystal display or a touch-panel display.

The storage unit 130 is a memory that stores therein computer programs executed by the PC 10, information that is used during processes performed by the PC 10, etc. The storage unit 130 is realized by an existing magnetically, optically, or electrically recordable storage device, such as a hard disk drive (HDD), a solid state drive (SSD), a memory card, an optical disk, a read only memory (ROM), and a random access memory (RAM). The storage unit 130 includes a first software-identifier storage unit 132. The first software-identifier storage unit 132 will be described in detail later.

The control unit 140 serves to control the whole of the PC 10. The control unit 140 is realized by, for example, a central processing unit (CPU) or the like. The control unit 140 includes an OS 142, an application 144, an installer 150, and a printer driver 160. The OS 142, the application 144, the installer 150, and the printer driver 160 are implemented when the control unit 140 activates (executes) an OS program, an application program, an installer program, and a printer driver program, which are stored in the storage unit 130, respectively. It is possible to add a new feature to the printer driver 160 by installing a first plugin that is a plugin for extending features of the driver.

The OS 142 serves to control the various units of the PC 10 (both the hardware and the software of PC 10). The OS 142 is, for examples, basic software, such as Windows (trademark) or UNIX (trademark).

The application 144 serves to enable the PC 10 to, for example, create a document, browse a document, or perform numerical computing. The application 144 is, for example, word-processing software, browsing software, or spreadsheet software and works on the basic software. The application 144 receives various instructions from the operation unit 110, such as an instruction to display the print setting screen or an instruction to print image data, and sends the received instructions to the later-described printer driver 160 via the OS 142.

The installer 150 serves to install the first plugin, which is a target to be installed that is stored in the storage unit 130, into the printer driver 160. The installer 150 is realized by, for example, software for installation. The installer 150 includes a software-identifier acquiring unit 152, an installable plugin determining unit 154, and an installing unit 156.

The first software-identifier storage unit 132 is described here. The first software-identifier storage unit 132 stores therein a first software identifier that identifies software of the printer into which a second plugin, which is a plugin for extending features of the printer that enables the printer to implement a feature corresponding to a feature realized by the first plugin installed into the printer driver 160, can be installed. In the first embodiment, the platform that serves to control the printer is used as an example of this software.

Figures 3, 4:
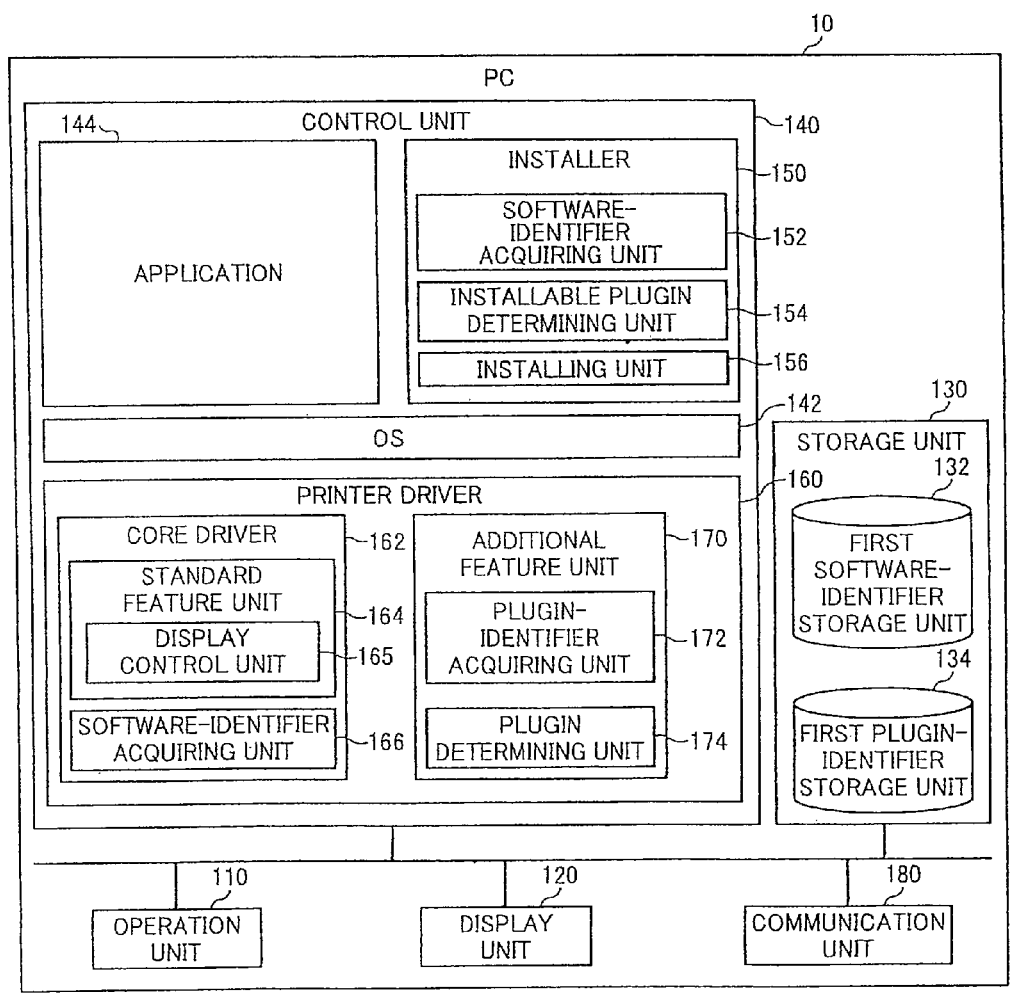
FIG. 3 shows an example of a first software identifier.
FIG. 4 is a block diagram of the exemplary configuration of the PC according to the first embodiment with a first plugin for a printer driver being installed.

FIG. 3 shows an example of the first software identifier. In the example shown in FIG. 3, the first software identifier indicates names of platforms. The names of platforms are stored in an associated manner with the first plugin to be installed by the installer 150 in the first software-identifier storage unit 132 in the form of an ini file.

More particularly, the scope name "pluginA" indicates the name of the first plugin. The pieces of data "platformA" and "plaatformC" that are assigned to "PlatformName" in the scope name "pluginA" indicate the names of the platforms. That is, the example shown in FIG. 3 indicates that the platforms, into which the second plugin that enables the printer to implement the feature corresponding to the feature realized by "pluginA" can be installed, are "platformA" and "platformC".

Referring back to FIG. 2, the software-identifier acquiring unit 152 acquires a second software identifier that identifies a platform of the printer 20 to be controlled by the printer driver 160 (an example of a printing device under the control of the printer driver). More particularly, upon receiving an install instruction from the operation unit 110, the software-identifier acquiring unit 152 instructs the printer driver 160 to acquire the second software identifier, thereby acquiring the second software identifier.

For example, the software-identifier acquiring unit 152 acquires the second software identifier from the printer driver 160 using a free text portion of an interface supported by the printer driver 160. With this configuration, even if the first plugin cannot be installed in the printer driver 160, the software-identifier acquiring unit 152 can send an inquiry to the printer driver 160 without a program error or the like.

The installable plugin determining unit 154 acquires the first software identifier from the first software-identifier storage unit 132, compares the first software identifier with the second software identifier that is acquired by the software-identifier acquiring unit 152, and determines whether the second plugin can be installed in the platform of the printer 20. More particularly, if the first software identifier is consistent with the second software identifier, the installable plugin determining unit 154 determines that the second plugin can be installed in the platform of the printer 20. If the first software identifier is not consistent with the second software identifier, the installable plugin determining unit 154 determines that the second plugin cannot be installed in the platform of the printer 20.

Suppose there is a case, as shown in FIG. 3, that the first software identifier is "platformA" and "platformC". If the second software identifier that is acquired by the software-identifier acquiring unit 152 is "platformA" or "platformC", then the installable plugin determining unit 154 determines that the second plugin can be installed in the platform of the printer 20. If the second software identifier that is acquired by the software-identifier acquiring unit 152 is a platform different from "platformA" and "platformC", then the installable plugin determining unit 154 determines that the second plugin cannot be installed in the platform of the printer 20.

If the installable plugin determining unit 154 determines that the second plugin can be installed, the installing unit 156 installs the first plugin into the printer driver 160. If the installable plugin determining unit 154 determines that the second plugin cannot be installed, the first plugin is not installed in the printer driver 160.

The printer driver 160 serves to enable the PC 10 to operate the printer 20. The printer driver 160 is realized by software making up the difference between the OS 142 and the printer 20. The printer driver 160 includes a core driver 162.

As described above, the printer driver 160 is configured so that it is possible to extend the features of the printer driver 160 by installing the first plugin using the installer 150. The feature of the first plugin added by the installer 150 to the printer driver 160 will be described later.

The core driver 162 is a default function unit of the printer driver 160 present regardless whether the first plugin is installed. The core driver 162 includes a standard feature unit 164 and a software-identifier acquiring unit 166.

The standard feature unit 164 includes a display control unit 165. When the standard feature unit 164 receives, from the application 144 via the OS 142, an instruction to display a print setting screen, the display control unit 165 displays the print setting screen on the display unit 120. The standard feature unit 164 sets print settings in accordance with instructions received from the operation unit 110 via the print setting screen.

The standard feature unit 164 receives data containing an image to be printed from the application 144 via the OS 142, etc. together with printing settings, etc., and converts the data into a print command executable by the printer 20. The standard feature unit 164 causes the communication unit 180 to send the converted print command to the printer 20, thereby causing the printer 20 to print the image data to be printed.

The software-identifier acquiring unit 166 receives a second-software-identifier acquisition instruction from the installer 150 and acquires the second software identifier from the printer 20. More particularly, upon receiving the second-software-identifier acquisition instruction from the installer 150, the software-identifier acquiring unit 166 acquires the second software identifier from the printer 20 through two-way communications between the communication unit 180 and the printer 20. The two-way communications between the communication unit 180 and the printer 20 is, for example, simple network management protocol (SNMP) communications.

The communication unit 180 serves to send/receive information to/from an external device, such as the printer 20, via the network 5. The communication unit 180 is realized by an existing communication device, such as a communication interface. For example, the communication unit 180 sends the second-software-identifier acquisition request to the printer 20 and receives the second software identifier from the printer 20, and sends the print command created by the standard feature unit 164 to the printer 20.

The configuration of the PC 10 with the first plugin for the printer driver 160 being uninstalled has been described in the above paragraphs with reference to FIG. 2. The configuration of the PC 10 with the first plugin for the printer driver 160 being installed is described in the following paragraphs with reference to FIG. 4.

FIG. 4 is a block diagram of the exemplary configuration of the PC 10 according to the first embodiment with the first plugin for the printer driver 160 being installed. When the first plugin is installed in the printer driver 160 of the PC 10, the configuration of the PC 10 is changed from the configuration shown in FIG. 2 to the configuration shown in FIG. 4 and a first plugin-identifier storage unit 134 is added to the storage unit 130 and a additional feature unit 170 is added to the printer driver 160. More specifically, the additional feature unit 170 is implemented as a part of the printer driver 160 when the first plugin is installed and both a first plugin program stored in the storage unit 130 and a printer driver program are activated (executed) by the control unit 140. The first plugin-identifier storage unit 134 and the additional feature unit 170 are described below.

The first plugin-identifier storage unit 134 stores therein the first plugin identifier that identifies the first plugin. In the first embodiment, the first plugin identifier is the ID of the first plugin and the ID of the first plugin is identical to the ID of the second plugin. However, the configuration is not limited thereto.

The additional feature unit 170 is a function unit that is added to the printer driver 160 when the first plugin is installed. The additional feature unit 170 includes a plugin-identifier acquiring unit 172 and a plugin determining unit 174.

The plugin-identifier acquiring unit 172 acquires, from the printer 20, an installed plugin identifier that identifies the plugin that has been installed in the platform of the printer 20. More particularly, upon receiving a print-setting prohibition check instruction from the standard feature unit 164, the plugin-identifier acquiring unit 172 acquires the installed plugin identifier from the printer 20 through the two-way communications between the communication unit 180 and the printer 20.

The plugin determining unit 174 determines whether the installed plugin identifier, which is acquired by the plugin-identifier acquiring unit 172, identifies the second plugin.

More particularly, the plugin determining unit 174 acquires the first plugin identifier from the first plugin-identifier storage unit 134. If the acquired first plugin identifier is identical to the installed plugin identifier that is acquired by the plugin-identifier acquiring unit 172, the plugin determining unit 174 determines that the installed plugin identifier identifies the second plugin. If the acquired first plugin identifier is not identical to the installed plugin identifier that is acquired by the plugin-identifier acquiring unit 172, the plugin determining unit 174 determines that the installed plugin identifier does not identify the second plugin. It is noted that the first plugin identifier is the ID of the first plugin, and the ID of the first plugin and the ID of the second plugin are identical; therefore, if the first plugin identifier and the installed plugin identifier are identical, the installed plugin identifier can be identified as the ID of the second plugin.

If the plugin determining unit 174 determines that that the installed plugin identifier identifies the second plugin, the display control unit 165 of the standard feature unit 164 displays the print setting screen on the display unit 120 in a manner in which the first plugin is selectable. If the plugin determining unit 174 determines that the installed plugin identifier does not identify the second plugin, the display control unit 165 displays the print setting screen on the display unit 120 in a manner in which the first plugin is unselectable.

It is noted that the PC 10 does not always need all the above-described units. It is allowable to use a PC that includes only part of the above-described units.

Figure 5:
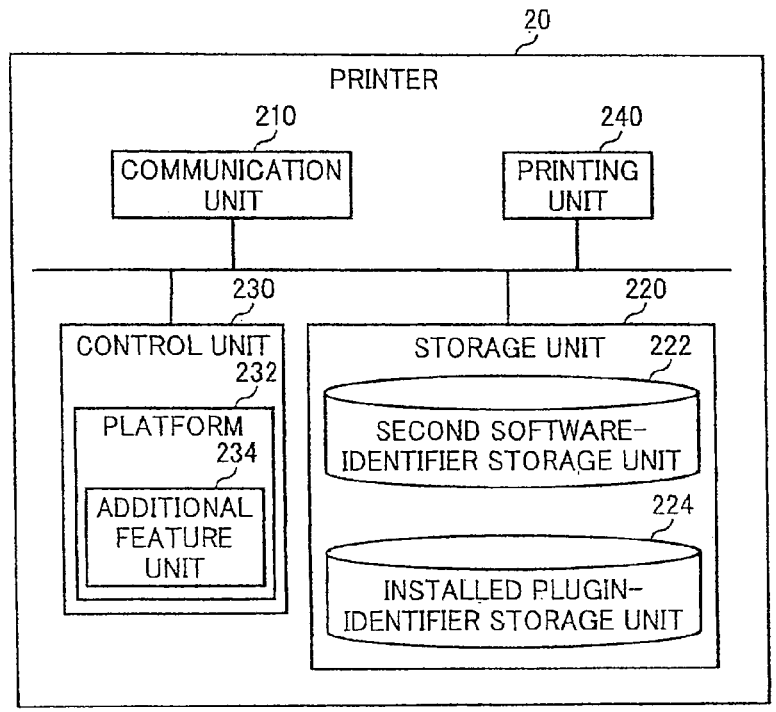
FIG. 5 is a block diagram of the exemplary configuration of a printer according to the first embodiment.

FIG. 5 is a block diagram of the exemplary configuration of the printer 20 according to the first embodiment. As shown in FIG. 5, the printer 20 includes a communication unit 210, a storage unit 220, a control unit 230, and a printing unit 240.

The communication unit 210 sends/receives information to/from an external device, such as the PC 10, via the network 5. The communication unit 210 can be realized by an existing communication device, such as a communication interface. For example, the communication unit 210 receives a second-software-identifier acquisition request from the PC 10 and sends the second software identifier that is stored in the storage unit 220 to the PC 10. Moreover, the communication unit 210 receives an installed-plugin-identifier acquisition request from the PC 10 and sends the installed plugin identifier that is stored in the storage unit 220 to the PC 10. Moreover, the communication unit 210 receives a print command from the PC 10.

The storage unit 220 is a memory that stores therein computer programs executed by the printer 20 and information that is used during processes performed by the printer 20. The storage unit 220 can be realized by an existing magnetically, optically, or electrically recordable storage device, such as a HDD, an SSD, a memory card, an optical disk, a ROM, and a RAM. The storage unit 220 includes a second software-identifier storage unit 222 that stores therein the second software identifier and an installed plugin-identifier storage unit 224 that stores therein the installed plugin identifier.

The control unit 230 serves to control the whole of the printer 20. The control unit 230 can be realized by a CPU or the like. The control unit 230 includes a platform 232. The platform 232 is implemented when the control unit 230 activates (executes) a platform program. The platform program is stored in the storage unit 220.

The platform 232 controls operations of the printer 20 and manages a process for installing the second plugin. The platform 232 includes an additional feature unit 234. The platform 232 can add (extend) a new feature by installing the second plugin. The additional feature unit 234 is implemented when the second plugin is installed. More specifically, the additional feature unit 234 is implemented when a second plugin program, which is stored in the storage unit 220 by installing the second plugin, is activated (executed) by the control unit 230.

The printing unit 240 prints the image data in accordance with the print command received by the communication unit 210.

It is noted that the printer 20 does not always need all the above-described units. It is allowable to use a printer that includes only part of the above-described units.

Operations of the printer system that includes the PC according to the first embodiment are described below.

Figure 6:
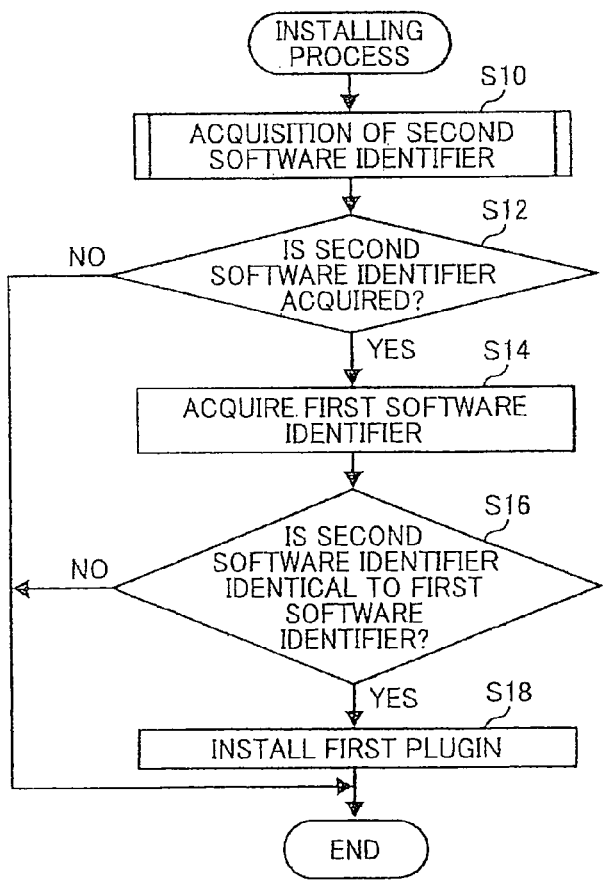
FIG. 6 is a flowchart showing an example of a first-plugin installing process performed by the PC according to the first embodiment.

FIG. 6 is a flowchart of a first-plugin installing process performed by the PC 10 according to the first embodiment.

The software-identifier acquiring unit 152 of the installer 150 acquires the second software identifier that identifies the software of the printer 20 that is under the control of the printer driver 160 (Step S10). This step of acquiring the second software identifier will de described in detail later. If the acquisition of the second software identifier fails (No at Step S12), the installer 150 ends the process.

If the second software identifier is acquired by the software-identifier acquiring unit 152 (Yes at Step S12), the installable plugin determining unit 154 acquires the first software identifier from the first software-identifier storage unit 132 (Step S14).

The installable plugin determining unit 154 checks whether the acquired first software identifier is consistent with the second software identifier acquired by the software-identifier acquiring unit 152 and thereby determines whether the second plugin can be installed in the platform of the printer 20 (Step S16).

If the installable plugin determining unit 154 determines that the second plugin can be installed (Yes at Step S16), the installing unit 156 installs the first plugin in the printer driver 160 (Step S18). If the installable plugin determining unit 154 determines that the second plugin cannot be installed (No at Step S16), the installer ends the process without installing the first plugin by the installing unit 156.

Figure 7:
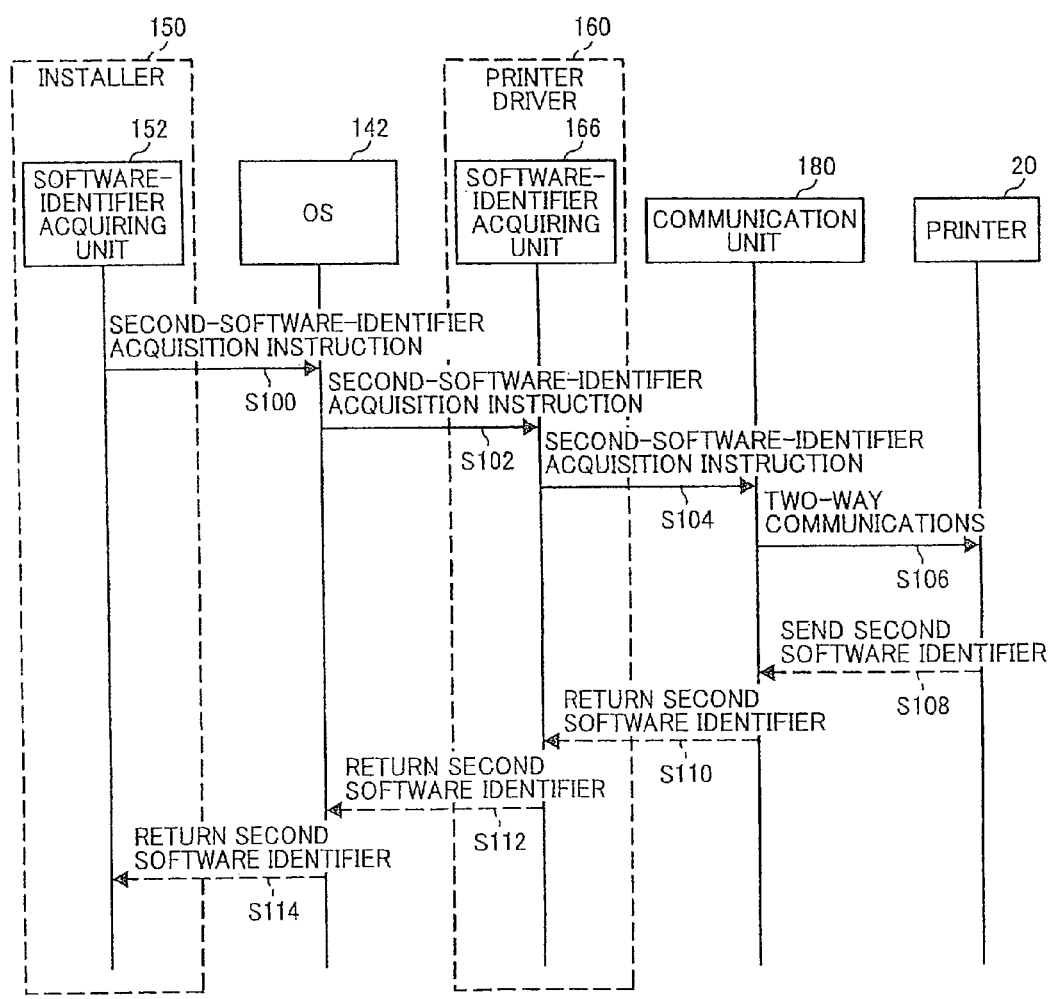
FIG. 7 is a sequence diagram showing an example of a second-software-identifier acquiring process performed by the printer system according to the first embodiment.

FIG. 7 is a sequence diagram showing an example of the second-software-identifier acquiring process performed by the printer system 1 according to the first embodiment. In the example shown in FIG. 7, the OS 142 is Windows (trademark).

The software-identifier acquiring unit 152 of the installer 150 instructs the OS 142 to acquire the second software identifier (Step S100). More particularly, the software-identifier acquiring unit 152 sets DC_PERSONALITY to the third argument of DeviceCapabilities( ) and executes DeviceCapabilities( ).

Upon receiving the second-software-identifier acquisition instruction from the software-identifier acquiring unit 152, the OS 142 instructs the software-identifier acquiring unit 166 of the printer driver 160 to acquire the second software identifier (Step S102). More particularly, the OS 142 sets DC_PERSONALITY to the third argument of DrvDeviceCapabilities( ) and executes DrvDeviceCapabilities( ).

The software-identifier acquiring unit 166 instructs the communication unit 180 to acquire the second software identifier (Step S104).

The communication unit 180 sends the second-software-identifier acquisition request to the printer 20 via the two-way communications (Step S106).

The printer 20 receives the second-software-identifier acquisition request from the communication unit 180 and sends the second software identifier to the communication unit 180 (Step S108).

The communication unit 180 returns the second software identifier to the software-identifier acquiring unit 166 of the printer driver 160 (Step S110).

The software-identifier acquiring unit 166 returns the second software identifier to the OS 142 (Step S112). Because DC_PERSONALITY is set at Step S102 to the third argument of DeviceCapabilities( ), the software-identifier acquiring unit 166 returns the second software identifier using a free text portion. More particularly, the software-identifier acquiring unit 166 stores the second software identifier that has been received from the communication unit 180 in a predetermined region of the storage unit 130 and returns the address of the region to the OS 142.

The OS 142 returns the second software identifier to the software-identifier acquiring unit 152 of the installer 150 (Step S114).

Figure 8:
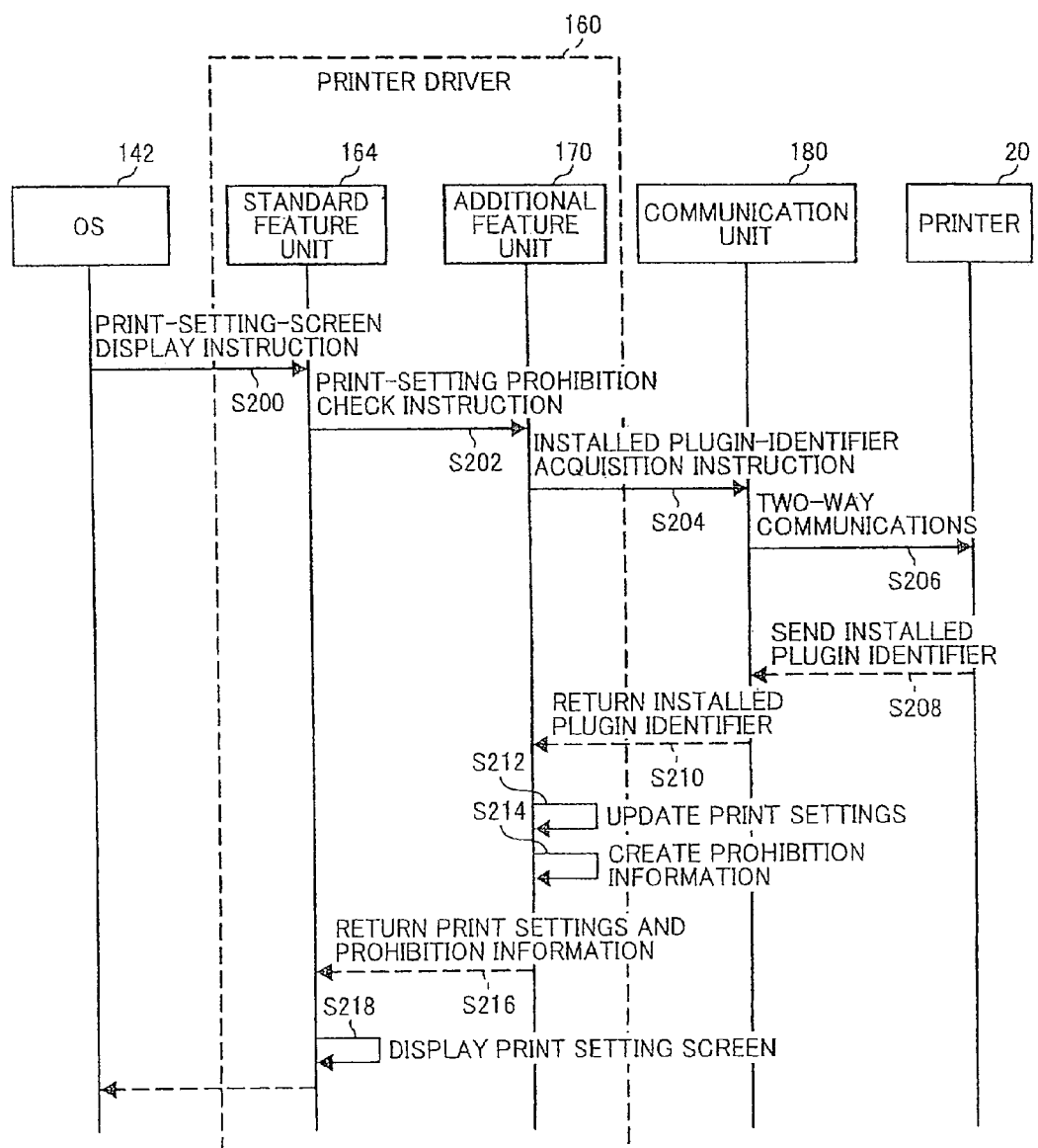
FIG. 8 is a sequence diagram showing an example of a print-setting-screen displaying process performed by the printer system according to the first embodiment.

FIG. 8 is a sequence diagram showing an example of a print-setting-screen displaying process performed by the printer system 1 according to the first embodiment. The print-setting-screen displaying process shown in FIG. 8 is performed after the first plugin is installed.

Upon receiving a print-setting-screen display instruction from the application 144, the OS 142 instructs the standard feature unit 164 of the printer driver 160 to display the print setting screen (Step S200).

The standard feature unit 164 instructs the additional feature unit 170 to make a prohibition check with the print settings about the feature of the first plugin that is installed in the printer driver 160 (Step S202).

Upon receiving the print-setting prohibition check instruction, the plugin-identifier acquiring unit 172 of the additional feature unit 170 instructs the communication unit 180 to acquire the installed plugin identifier (Step S204).

The communication unit 180 then sends the installed-plugin-identifier acquisition request to the printer 20 via the two-way communications (Step S206).

The printer 20 receives the installed-plugin-identifier acquisition request from the communication unit 180 and sends the installed plugin identifier to the communication unit 180 (Step S208).

The communication unit 180 returns the installed plugin identifier to the plugin-identifier acquiring unit 172 of the additional feature unit 170 (Step S210).

The plugin determining unit 174 of the additional feature unit 170 determines whether the installed plugin identifier that has been acquired by the plugin-identifier acquiring unit 172 identifies the second plugin. If the installed plugin identifier does not identify the second plugin, the plugin determining unit 174 changes the print settings so as to set the feature of the first plugin OFF (Step S212) and creates prohibition information about the feature of the first plugin (Step S214). If the installed plugin identifier identifies the second plugin, the plugin determining unit 174 skips the processes of Steps S212 and S214.

The plugin determining unit 174 returns the print settings and the prohibition information about the feature of the first plugin to the standard feature unit 164 (Step S216).

After that, the display control unit 165 of the standard feature unit 164 displays the print setting screen on the display unit 120 in accordance with the print settings and the prohibition information about the feature of the first plugin (Step S218). If, for example, the print settings are changed such that the feature of the first plugin is set OFF and the prohibition information is created, the print setting screen is displayed on the display unit 120 in a manner in which the feature of the first plugin is displayed in a semitransparent manner and unselectable. If the print settings are not changed and no prohibition information is created, the print setting screen is displayed on the display unit 120 in a manner in which the feature of the first plugin is selectable.

As seen from above discussion, in the first embodiment, the first plugin is installed in the printer driver 160 only when the second plugin, which enables the printer 20 to implement the feature corresponding to the feature of the first plugin, can be installed in the platform of the printer 20, and a feature corresponding to a feature, which cannot be available in the printer 20 even after feature extension, can be prevented from being added to the printer driver 160.

In the first embodiment, if the first plugin is installed in the printer driver 160 but the second plugin is not installed in the platform of the printer 20, the printer driver 160 displays the print setting screen on the display unit 120 in a manner in which the feature of the first plugin is unselectable. After the second plugin is installed in the platform of the printer 20, the printer driver 160 displays the print setting screen on the display unit 120 in a manner in which the feature of the first plugin is selectable.

Therefore, in the first embodiment, the printer driver 160 can enable the feature of the first plugin only when the second plugin is installed in the platform of the printer 20, which prevents the feature inconsistency.

Second Embodiment

A second embodiment is described below in which the PC acquires the second software identifier without making two-way communications with the printer 20. The second embodiment is described below, placing an emphasis on the differences between the first embodiment and the second embodiment. Parts corresponding to those in the first embodiment are denoted with the same names and the same reference numerals, and the same description is not repeated.

First, the configuration of a PC according to the second embodiment is described. The printer system that includes the PC according to the second embodiment has the same configuration as the printer system according to the first embodiment has, and the same description is not repeated.

Figure 9:
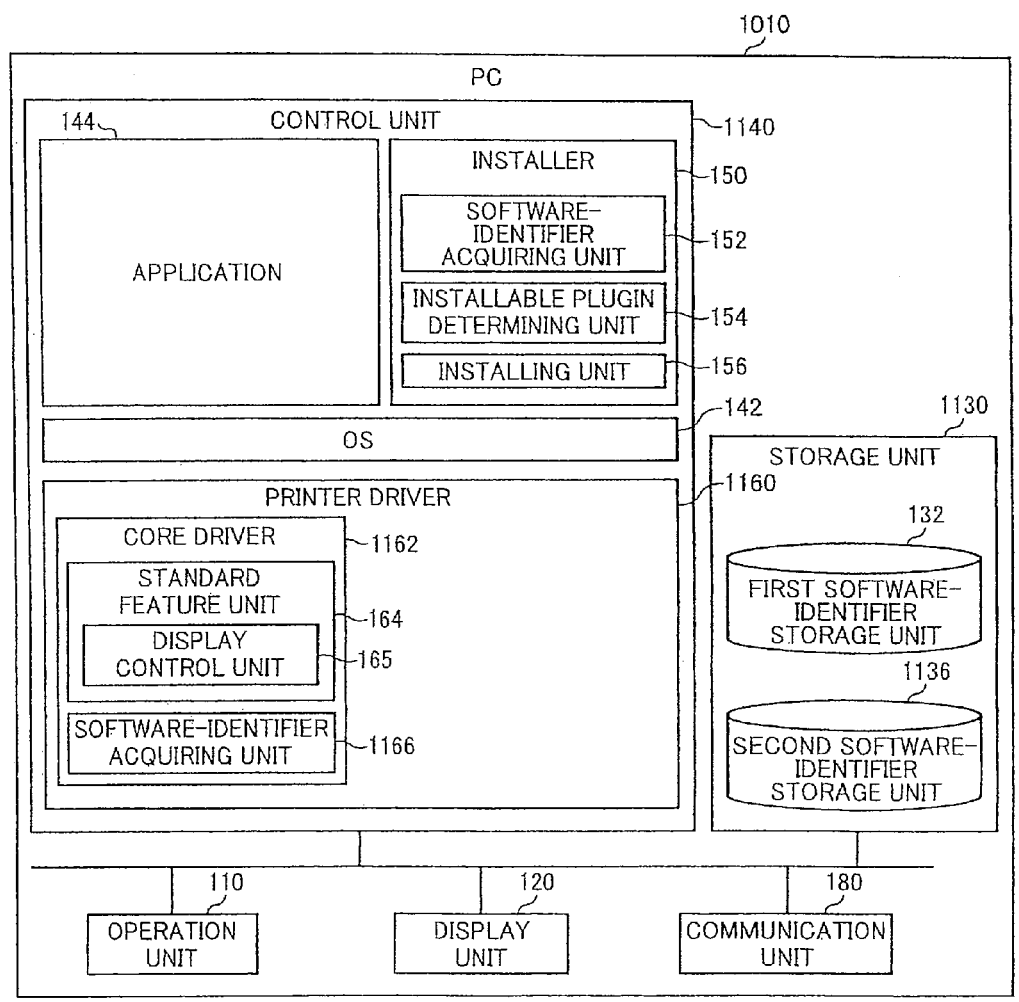
FIG. 9 is a block diagram of the exemplary configuration of a PC according the second embodiment with the first plugin being uninstalled.

FIG. 9 is a block diagram of the configuration of a PC 1010 according the second embodiment with the first plugin being uninstalled. The PC 1010 shown in FIG. 9 is different from the PC 10 according to the first embodiment with the first plugin being uninstalled in that a storage unit 1130 includes a second software-identifier storage unit 1136 and a software-identifier acquiring unit 1166 of a core driver 1162 of a printer driver 1160 of a control unit 1140 acquires the second software identifier from the second software-identifier storage unit 1136.

Because the major differences between the first embodiment and the second embodiment are in the second software-identifier storage unit 1136 and the software-identifier acquiring unit 1166, the second software-identifier storage unit 1136 and the software-identifier acquiring unit 1166 are described below.

Figures 10, 11:
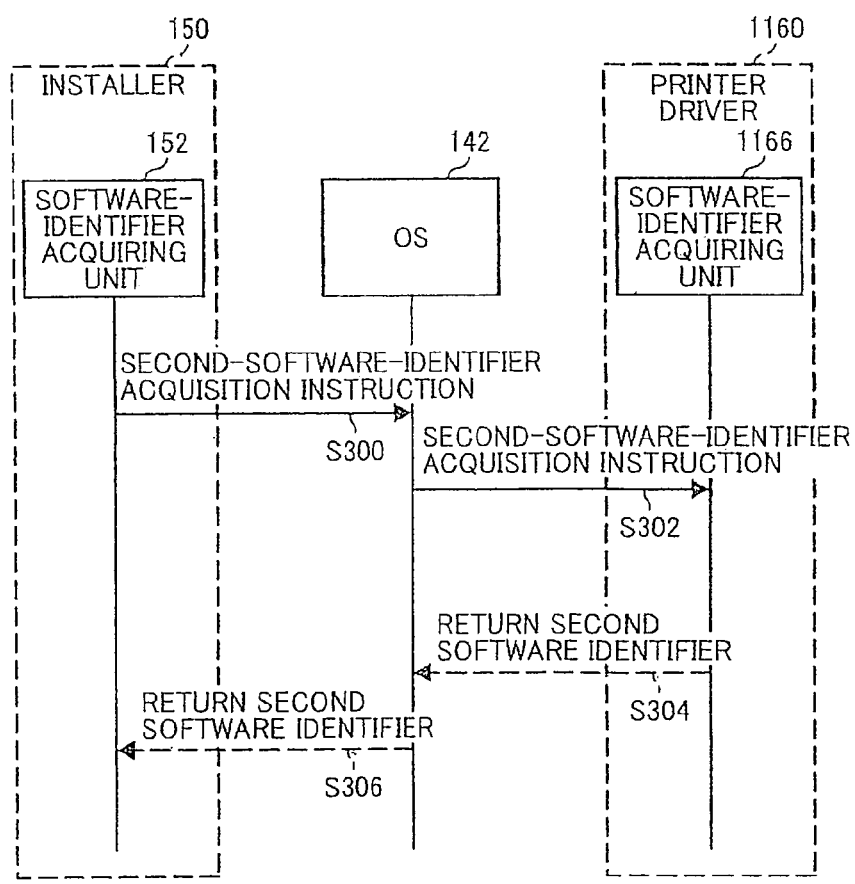
FIG. 10 is a schematic diagram of an example of a second software identifier.
FIG. 11 is a sequence diagram showing an example of a second-software-identifier acquiring process performed by the PC according to the second embodiment.

The second software-identifier storage unit 1136 stores therein the second software identifier. FIG. 10 is a schematic diagram of an example of the second software identifier. In the example shown in FIG. 10, the second software identifier indicates the name of the platform. The second software identifier is stored in the second software-identifier storage unit 1136 in the form of an ini file in an associated manner with the name of the printer 20 that is under the control of the printer driver 1160.

More particularly, the scope name "PrinterA" indicates the name of the printer 20. The piece of data "platformA" that is assigned to "PlatformName" within the scope "pluginA" indicates the name of the platform. That is, the example shown in FIG. 10 indicates that platform of "PrinterA" is "platformA".

Referring back to FIG. 9, upon receiving the second-software-identifier acquisition instruction from the installer 150, the software-identifier acquiring unit 1166 acquires the second software identifier from the second software-identifier storage unit 1136.

When the first plugin in installed in the PC 1010, the first plugin-identifier storage unit 134 is added to the storage unit 1130 and the additional feature unit 170 is added to the printer driver 1160 as in the same manner in the first embodiment. The same description in this regard is not repeated.

Operations of the PC according to the second embodiment are described below. The operations according to the second embodiment are almost the same as those according to the first embodiment except for the second-software-identifier acquiring process. Therefore, the second-software-identifier acquiring process, which is the major difference between the first embodiment and the second embodiment, is described below.

FIG. 11 is a sequence diagram showing an example of the second-software-identifier acquiring process performed by the PC 1010 according to the second embodiment.

The software-identifier acquiring unit 152 of the installer 150 instructs the OS 142 to acquire the second software identifier (Step S300).

Upon receiving the second-software-identifier acquisition instruction from the software-identifier acquiring unit 152, the OS 142 instructs the software-identifier acquiring unit 1166 of the printer driver 1160 to acquire the second software identifier (Step S302).

The software-identifier acquiring unit 1166 acquires the second software identifier from the second software-identifier storage unit 1136 and returns the second software identifier to the OS 142 (Step S304).

The OS 142 returns the second software identifier to the software-identifier acquiring unit 152 of the installer 150 (Step S306).

As seen from above discussion, the second embodiment brings the same effects as in the first embodiment, i.e., the first plugin is installed in the printer driver 1160 only when the second plugin, which enables the printer 20 to implement the feature corresponding to the feature of the first plugin, can be installed in the platform of the printer 20, and a feature corresponding to a feature, which cannot be available in the printer 20 even after feature extension, can be prevented from being added to the printer driver 1160.

(Hardware Configuration)

Examples of the hardware configuration of the PCs according to the first and the second embodiments are described below.

The PCs according to the first and the second embodiments include a control device, such as a CPU, a storage device, such as a ROM or a RAM, an external storage device, such as an HDD or a removable drive disk, a display device, such as a display, and an input device, such as a keyboard or a mouse. The PCs have the hardware configuration implementable by a widely used computer.

The installer program and the printer driver program that are executed by the PCs according to the first and the second embodiments are stored in a form of an installable or executable file in a recording media readable by the computer, such as a CD-ROM, a CD-R, a memory card, a digital versatile disk (DVD), a flexible disk (FD).

Alternatively, the installer program and the printer driver program that are executed by the PCs according to the first and the second embodiments can be stored in another computer that is connected to the PCs via a network, for example, the Internet and downloaded to the PCs via the network. The installer program and the printer driver program that are executed by the PCs according to the first and the second embodiments can be delivered or distributed via a network such as the Internet. The installer program and the printer driver program that are executed by the PCs according to the first and the second embodiments can be provided in a state preinstalled into a recording medium such as a ROM.

The installer program executed by the PCs according to the first and the second embodiments are made up of modules that implement the above-described units on the computer (e.g., the software-identifier acquiring unit, the installable plugin determining unit, and the installing unit). When the CPU reads the installer program from the HDD, loads the read installer program on the RAM, and executes the loaded installer program, the above-described units (e.g., the software-identifier acquiring unit, the installable plugin determining unit, and the installing unit) are implemented on the computer.

The printer driver program executed by the PCs according to the first and the second embodiments are made up of modules that serve to implement the above-described units on the computer (e.g., the core driver, the standard feature unit, the display control unit, the software-identifier acquiring unit, the additional feature unit, the plugin-identifier acquiring unit, and the plugin determining unit). When the CPU reads programs from the HDD, loads the read programs on the RAM, and executes the loaded programs, the above-described units (e.g., the core driver, the standard feature unit, the display control unit, the software-identifier acquiring unit, the additional feature unit, the plugin-identifier acquiring unit, and the plugin determining unit) are implemented on the computer.

In the first and the second embodiments, the printer is used as the printing device. However, as the printing device, some other devices can be used, for example, a multifunction printer (MFP) that has two or more functions including the printer function and any of the copy function, the scanner function, and the facsimile function.

According to the present invention, a feature corresponding to a feature, which cannot be available in a printing device even after feature extension, can be prevented from being added to the associated printer driver.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a printer driver configured to identify software of a printing device that is under a control of the printer driver;
   basic software that performs basic control of the information processing apparatus; and
   an installer that installs a plugin in the printer driver, wherein
   the information processing apparatus includes a first software-identifier storage unit having a memory that stores therein a first software identifier that identifies software of a printing device, the printing device having a second plugin for enabling the printing device to implement a feature corresponding to a feature of a first plugin to be installed in the printer driver,
   the basic software includes a software-identifier acquiring unit that instructs the printer driver to acquire a second software identifier that identifies the software of the printing device that is under the control of the printer driver,
   the installer includes,
      an installable plugin determining unit that,
         acquires the first software identifier from the first software-identifier storage unit,
         compares the first software identifier with the second software identifier acquired by the printer driver from the printing device, which is acquired by the software-identifier acquiring unit, and
         determines whether the second plugin is installable in the software of the printing device under the control of the printer driver, and
      an installing unit that installs, if it is determined that the second plugin is installable in the printing device, the first plugin in the printer driver, and the print driver includes,
a plugin-identifier acquiring unit that acquires an installed plugin identifier that identifies a plugin installed in the software of the printina device under the control of the printer driver,
a plugin determining unit that determines whether the installed plugin identifier that is acquired by the plugin-identifier acquiring unit identifies the second plugin, and
a display control unit that displays, when the installed plugin identifier identifies the second plugin, a print setting screen on a display unit in a manner in which the feature of the first plugin is selectable and displays, when the installed plugin identifier does not identify the second plugin, the print setting screen on the display unit in a manner in which the feature of the first plugin is unselectable.

2. The information processing apparatus according to claim 1, wherein if the first software identifier and the second software identifier are consistent, the installable plugin determining unit determines that the second plugin is installable in the software of the printing device under the control of the printer driver.

3. The information processing apparatus according to claim 1, wherein the software-identifier acquiring unit instructs the printer driver to acquire the second software identifier, thereby acquiring the second software identifier.

4. The information processing apparatus according to claim 3, wherein the printer driver causes a communication unit to make two-way communications with the printing device under the control of the printer driver and acquires the second software identifier via the two-way communications.

5. The information processing apparatus according to claim 3, further comprising a second software-identifier storage unit that stores therein the second software identifier, wherein
the printer driver acquires the second software identifier from the second software-identifier storage unit.

6. The information processing apparatus according to claim 3,
wherein the software-identifier acquiring unit acquires the second software identifier from the printer driver using a free text portion of an interface supported by the printer driver.

7. The information processing apparatus according to claim 1, further comprising a first plugin-identifier storage unit that stores therein the first plugin identifier that identifies the first plugin, wherein the plugin determining unit acquires the first plugin identifier from the first plugin-identifier storage unit and, if the acquired first plugin identifier is identical to the installed plugin identifier acquired by the plugin-identifier acquiring unit, determines that the installed plugin identifier identifies the second plugin and, if the acquired first plugin identifier is not identical to the installed plugin identifier acquired by the plugin-identifier acquiring unit, determines that the installed plugin identifier does not identify the second plugin.

8. The information processing apparatus according to claim 1, wherein the plugin-identifier acquiring unit causes the communication unit to make two-way communications with the printing device under the control of the printer driver and acquires the installed plugin identifier via the two-way communications.

9. The information processing apparatus according to any of claim 1,
wherein the software is a platform, and the first software identifier and the second software identifier indicate names of platforms.

10. The information processing apparatus of claim 1, wherein the printer driver is configured to disable features associated with the first plugin from being selectable by a user of the image information processing apparatus, if the first plugin is installed in the printer driver and the second plugin is not installed in the printing device.

11. The information processing apparatus of claim 1, wherein the printer driver comprises:
a display control unit configured to selectively enable a selection on a display unit of features of the printing device that are associated with the first plugin based on the determination by the installable plugin determining unit of whether the second plugin is installable in the printing device.

12. The information processing apparatus of claim 11, wherein the display control unit is configured disable the selection of the features of the printing device associated with the first plugin, if the installable plugin determining unit determines that the second plugin is not installable in the printing device.

13. The information processing apparatus of claim 1, wherein, upon the installing unit installing the first plugin in the printer driver, the printer driver is configured to provide one or more features of the printing device to a user of the image processing apparatus that were previously unavailable to the user.

14. A computer program product comprising a non-transitory computer-usable medium having computer-readable program codes, wherein
the program codes when executed causing a computer to execute:
installing, by an installer, a plugin in a printing driver;
acquiring, by a software-identifier acquiring unit included in basic software, a second software identifier that identifies, via the printer driver, software of the printing device that is under the control of the printer driver, the basic software performing basic control of an information processing apparatus;
determining, by an installable plugin determining unit included in the installer, whether the second plugin can be installed in the software of the printing device that is under the control of the printer by,
acquiring, from a first software-identifier storage unit, a first software identifier that identifies software of the printing device, in which a second plugin for enabling the printing device to implement a feature corresponding to a feature of a first plugin to be installed in the printer driver, and
comparing the first software identifier with the second software identifier that is acquired at the acquiring, and
installing, by an installing unit included in the installer, the first plugin in the printer driver if it is determined that the second plugin is installable, wherein the print driver includes,
a plugin-identifier acquiring unit that acquires an installed plugin identifier that identifies a plugin installed in the software of the printing device under the control of the printer driver,
a plugin determining unit that determines whether the installed plugin identifier that is acquired by the plugin-identifier acquiring unit identifies the second plugin, and a display control unit that displays, when the installed plugin identifier identifies the second plugin, a print setting screen on a display unit in a manner in which the feature of the first plugin is selectable and displays, when the installed plugin identifier does not identify the second plugin, the print setting screen on the display unit in a manner in which the feature of the first plugin is unselectable.

* * * * *